No. 802,710. PATENTED OCT. 24, 1905.
L. RUTLEDGE.
HAME FIXTURE.
APPLICATION FILED JUNE 5, 1905.

Fig. 1.
Fig. 2.
Fig. 3.
Fig. 4.

Witnesses:
R. J. Jaeker
M. A. Boss

Inventor:
Louis Rutledge
By Jno. H. Whipple
Atty.

UNITED STATES PATENT OFFICE.

LOUIS RUTLEDGE, OF EVANSVILLE, INDIANA.

HAME-FIXTURE.

No. 802,710. Specification of Letters Patent. Patented Oct. 24, 1905.

Application filed June 5, 1905. Serial No. 263,701.

*To all whom it may concern:*

Be it known that I, LOUIS RUTLEDGE, of Evansville, in the State of Indiana, have invented certain new and useful Improvements in Hame-Fixtures, of which the following is a specification.

My invention relates to improvements in hame-fixtures wherein a plate having keepers with slots in line is used in conjunction with a tug-piece or trace-hook provided with a perforated shank and a bolt adapted to be shot into the keepers and the slots therein for connecting said parts and adjusting the hook so as to elevate or depress the front end on the tug on the hame, as desired; and the objects of my improvements are, first, to provide end stops adapted to prevent the shank from passing clear out of the keepers at either end of the plate, and, second, to provide side stops adapted to prevent the hook from being turned forward so as to bring the shank into line with the slots without first lifting it over said side stops, and, third, to provide the hook-bolt with enlarged and contracted parts whereby it is adapted to enter the keepers sidewise rather than endwise. I attain these objects by the means illustrated in the accompanying drawings, in which—

Figure 1 is a front elevation of a fixture of the class mentioned containing my improvements. Fig. 2 is a central section on the line 2 2 of Fig. 1. Fig. 3 is a cross-section on the line 3 3 of Fig. 1. Fig. 4 is a section of the hook-shank on the line 4 4 of Fig. 1.

In the drawings the numeral 1 designates a metal plate the bottom side of which is provided with tangs 2 as the preferred means for securing it to the face of a hame. The top or face of the plate is provided with a shallow concave groove 3, closed end keepers 4, and slotted or side keepers 5, flanking the groove, the whole being preferably cast as an integral piece. The slotted or side keepers 5 are grooved on their interior at $3^a$, similar to the plate, and recessed on the upper side next to the plate, as shown at 6, so as to form on each an upwardly-projecting lug 7, adjacent to the inner side or slot therein. The spaces $7^a$ between the tip of lugs 7 and the bottom of the respective keepers are made uniform.

The metal tug-piece 8, as illustrated, has the prongs usually provided for its attachment in the ordinary way to the front end of a leather tug or flexible strap wound about a pin passing through holes in the tips of the prongs. It has a flat shank provided with a perforation 9 and a bolt 10, formed on the end thereof. The bolt has cylindrical parts $10^a$ and flattened or contracted parts $10^b$, the cylindrical parts being adapted to slide in the grooves 3 $3^a$, passing between and under the keepers when the shank is moved along in the line of slots therein. The length of the contracted parts $10^b$ is slightly greater than that of the side keepers, and the space between said parts $10^b$ corresponds with that between said side keepers, including the lugs 7 thereof. The diameter of said contracted parts is slightly less than the width of the slots $5^a$, Figs. 1 and 3, of said side keepers and corresponds substantially with the thickness of the shank of the tug-piece 8 or trace-hook, so that when said shank is brought into position perpendicular to the plate 1, with said contracted parts registering with any two of the side keepers, said bolt can be passed in sidewise and then be moved endwise to any position permitted by the end keepers 4, which operate as end stops on the shank, limiting the movement of said tug-piece endwise of said plate and preventing it from passing out of the keepers at either end. The parts $10^a$ when moved under the side keepers in the groove $3^a$ thereof prevent the separation of said tug-piece from said plate, but permit it to be turned in the keepers. The size and position of the perforation 9 are such relative to the side keepers, when such parts are thus connected, that said tug-piece can be turned back with one of the side keepers entering into said perforation, and when so turned back and let go of it will fall down behind and become engaged with two of the lugs 7, which operate as side stops to prevent it from being turned forward again so as to pass off of said keeper without first being lifted over said side stops. As seen in Fig. 3, some extra space between said side stops and the face of said plate is provided to allow the easy working of said parts and some play of the tug-piece back and forth; but the parts of the shank opposite to said perforation fit more closely between the tip of the lugs and the bottom of the keepers, as shown in Fig. 1, so that a close fit is afforded for turning the tug-piece in or out over said side stops without vertical play when over said side stops in order to insure the least possible liability to accidental displacement or separation of the parts when in service. The side stops come into operation when the holdback is on, so as to slacken the tug or trace, as in going downhill, and they prevent the tug-piece or trace-hook from being turned forward so as to bring the shank into line with the slots 5ª by the force of the holdback, the throw of the trace, or otherwise while the trace is slackened or its pulling force is relieved.

To adjust the tug or trace vertically on the hame, the tug-piece is first raised above the side stops, then turned forward to bring the shank into line with the slots, then shifted up or down, and turned back, so as to drop behind the side stops again at the place of the desired adjustment.

The side stops, as illustrated, are provided on both sides in preference to making the plates rights and lefts, in which case the side stops along one side of the slot would answer the purpose.

What is claimed is—

1. In a hame-fixture of the class specified, the plate adapted to be secured to the face of the hame and having a longitudinal groove flanked with uniformly-spaced keepers having slots in line and provided with stops at the ends of the plate, in combination with a tug-piece or hook having a shank provided with a perforation, and a bolt at the end of the shank provided with contracted parts and comparatively enlarged parts adapted to enter the slots sidewise of the bolt and engage the keepers, as specified.

2. In a hame-fixture of the class specified, the plate adapted to be secured to the face of the hame and having a longitudinal groove, uniformly-spaced keepers flanking said groove on both sides, and side stops on said keepers along one side of said groove, in combination with a tug-piece or hook having its shank provided with a perforation adapted to pass over a keeper and its side stop and a bolt at the end of the shank provided with contracted and enlarged parts adapted to enter between and engage the keepers, as specified.

3. In a hame-fixture of the class specified, the plate adapted to be secured to the face of the hame, and having a longitudinal groove flanked with uniformly-spaced, grooved keepers, end stops closing the keepers at both ends of the plate and side stops on the keepers along one side of the said groove in the plate, in combination with a tug-piece, or hook, having its shank provided with a perforation adapted to pass over a keeper and its side stop, and a bolt at the end of the shank provided with contracted and enlarged parts adapted to enter between the keepers sidewise and engage them, as specified.

LOUIS RUTLEDGE.

Witnesses:
 JOHN M. GREB,
 SEBASTIAN HEURICH.